March 9, 1948.                L. P. CROSMAN                2,437,506
                              REPEATER COMPASS
                           Filed June 16, 1943            6 Sheets-Sheet 2
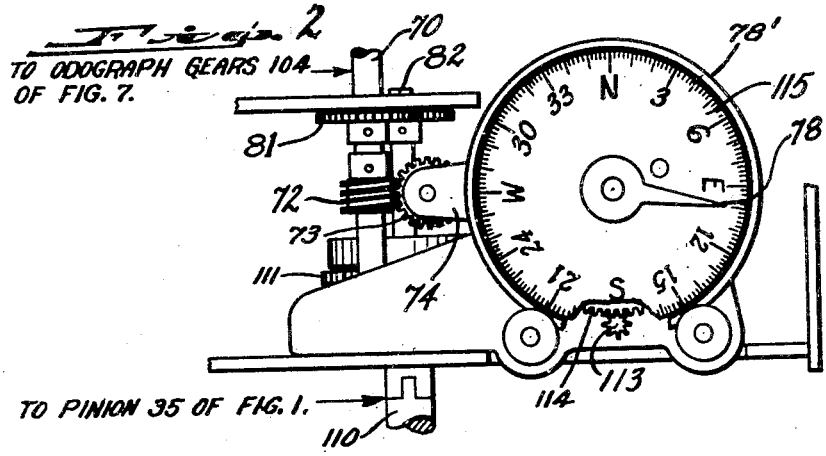
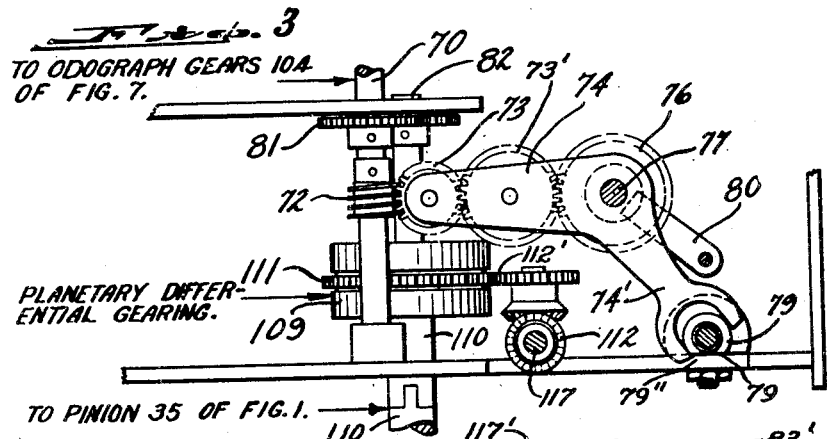
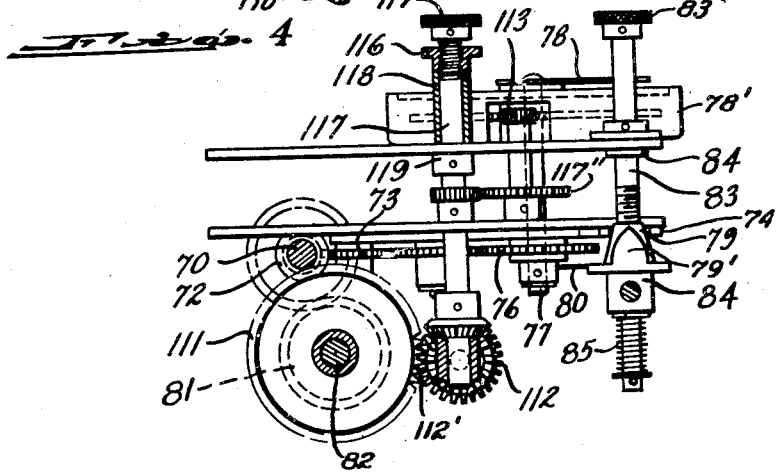
INVENTOR
Loring P. Crosman March 9, 1948.  L. P. CROSMAN  2,437,506
REPEATER COMPASS
Filed June 16, 1943  6 Sheets-Sheet 3

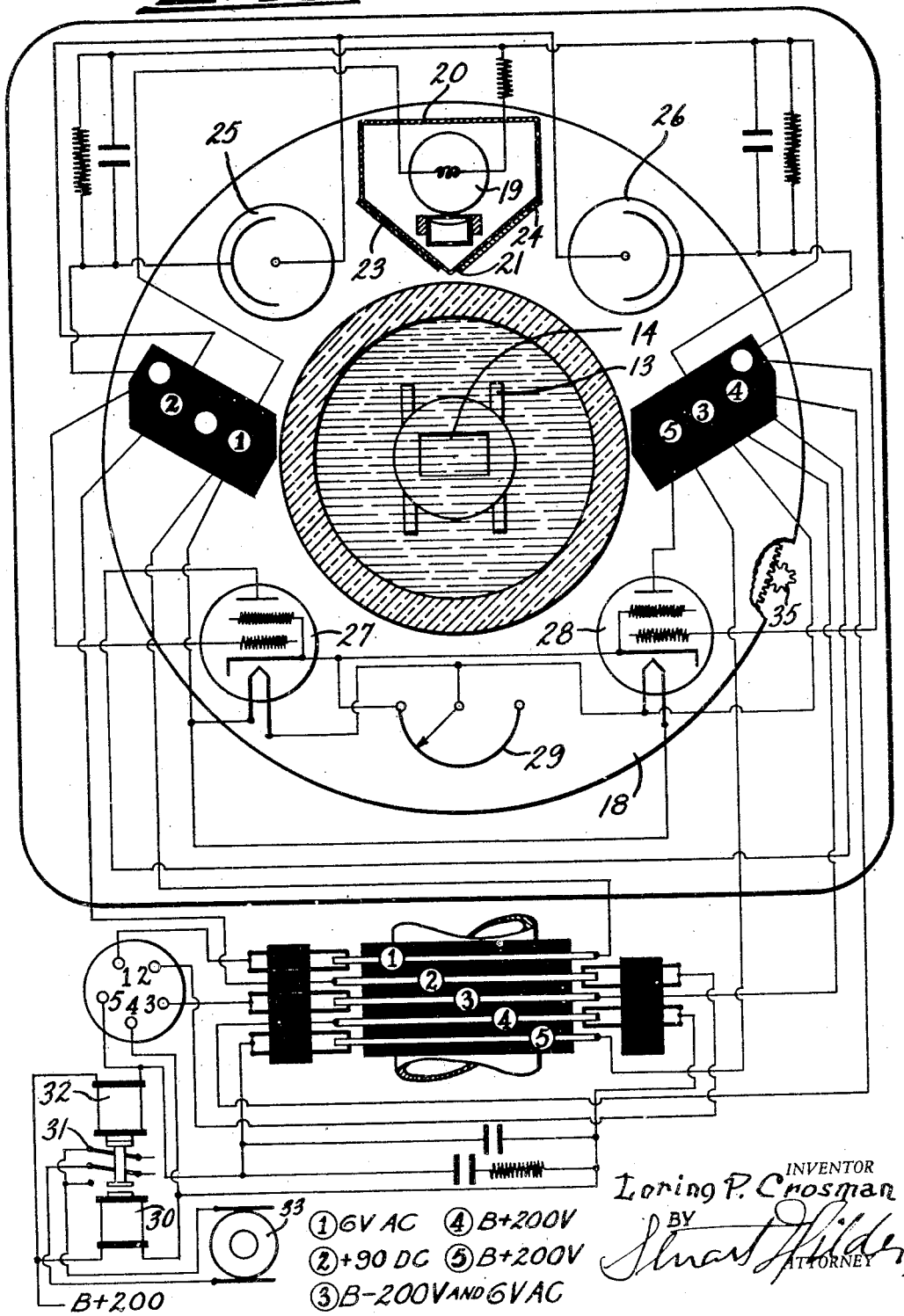

INVENTOR
Loring P. Crosman
BY
Stuart Held
ATTORNEY

Witness
Elmer W. Edwards

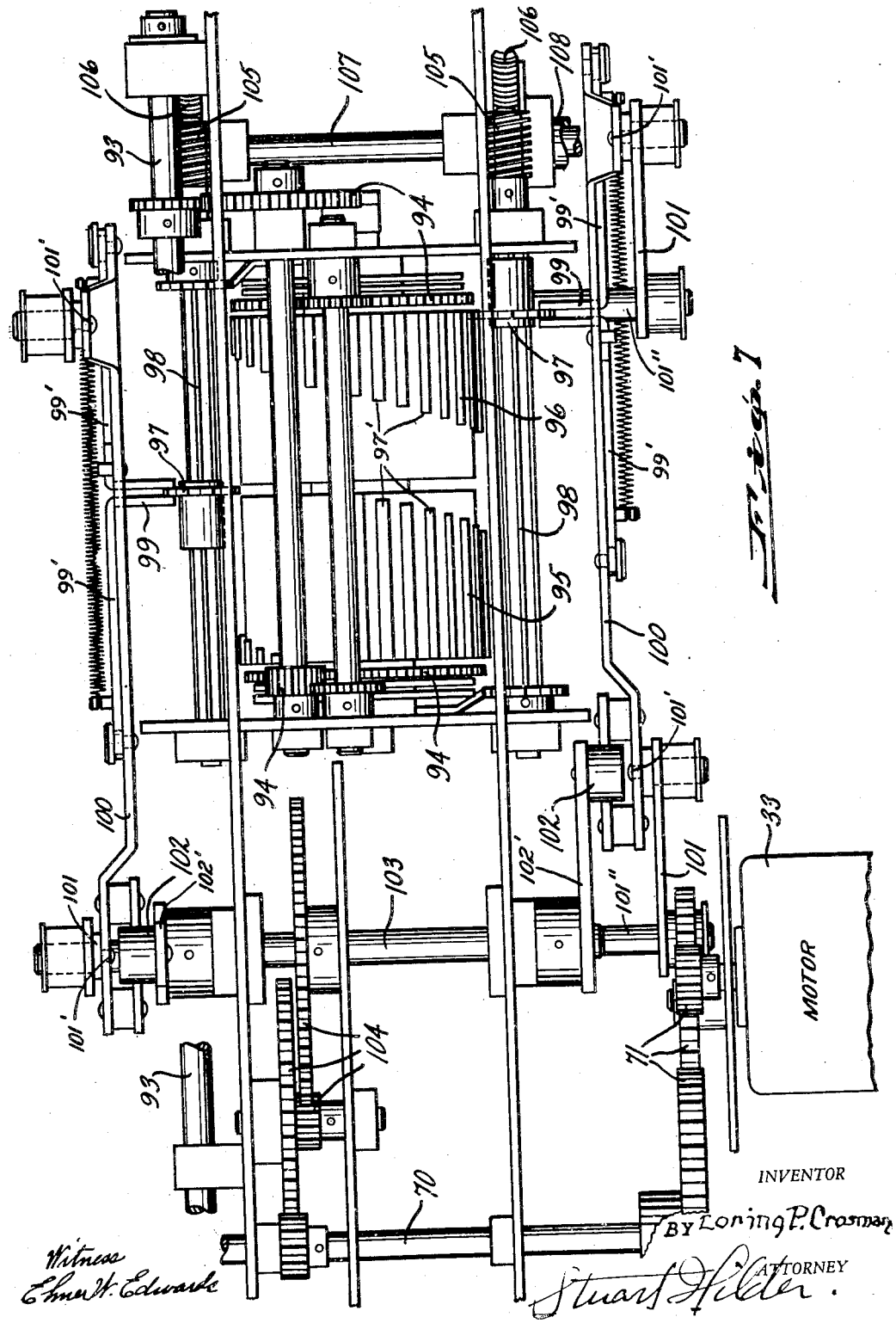

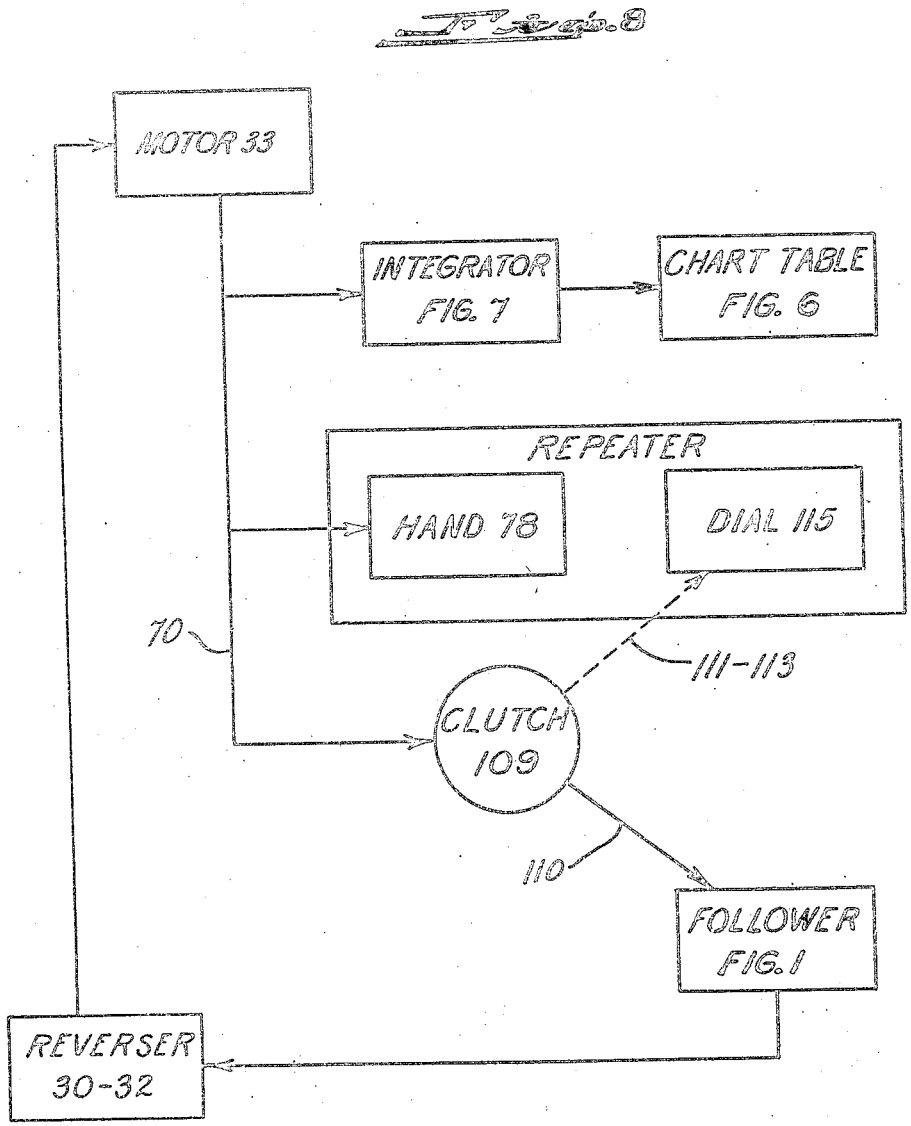

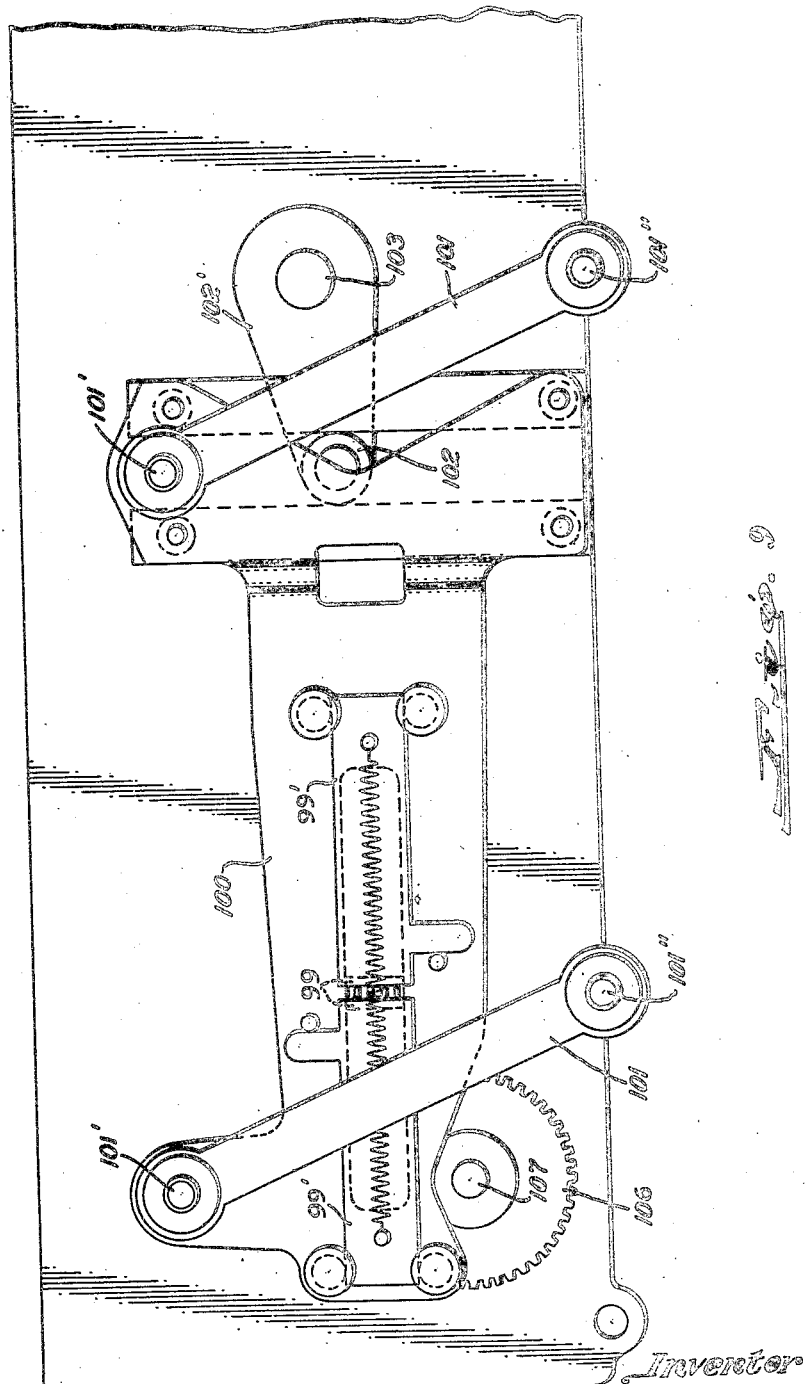

Patented Mar. 9, 1948

2,437,506

UNITED STATES PATENT OFFICE 2,437,506

REPEATER COMPASS

Loring Pickering Crosman, South Orange, N. J., assignor to Monroe Calculating Machine Company, Orange, N. J., a corporation of Delaware Application June 16, 1943, Serial No. 491,260

5 Claims. (Cl. 33—222)

The invention has relation to repeater compasses whereby the reading of a magnetic compass may be duplicated at a remote station and/or said magnetic compass may control other related mechanism.

The invention consists in the novel construction and combination of parts as set forth in the appended claims.

In the accompanying drawings illustrating the invention,

Fig. 1 is a diagrammatic plan view of a magnetic compass provided with follower mechanism.

Fig. 2 is a plan view of a repeater compass, constructed in accordance with the invention.

Fig. 3 is a similar view with parts removed.

Fig. 4 is a side elevation of the repeater compass of Figs. 2 and 3 with parts broken into section.

Fig. 7 is a plan view of the integrator or integrating means of an odograph.

Fig. 8 is a diagram illustrating the relationship of the various devices comprising the invention.

Figure 9 is a side view of the integrating means of Fig. 7, with certain parts omitted, parts being broken away.

Figure 6:
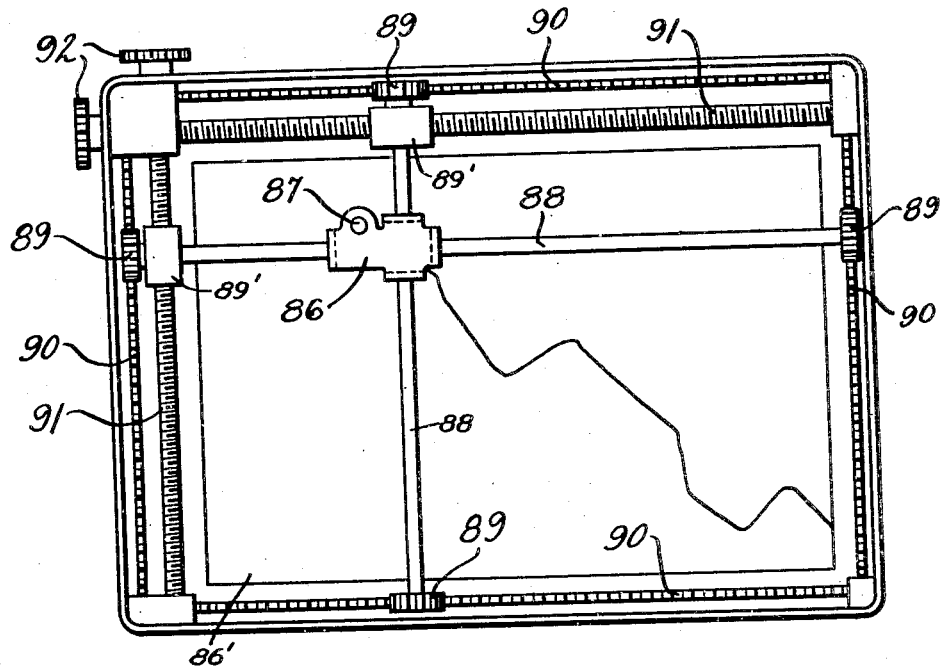
Fig. 6 is a plan view of the plotting mechanism of an odograph.

The magnetic compass with which the repeater of the present application is shown as associated is disclosed in U. S. Patent No. 2,325,585, issued to E. F. Britten, Jr., on July 27, 1943.

The follower mechanism of the compass is controlled by photo-electric devices comprising a source of light 19 (Fig. 1) mounted within a closure 20 having a vertical slot 21 in its inner wall, light from source 19 passing through slot 21 and striking a mirror 14 fixed upon the frame which carries the compass needle 13. The closure 20, together with the photo-electric tubes to be described, are carried on a rotary plate 18 mounted within the compass casing, and upon rotary driven movement of the plate, as modified by turning movement of the conveyance in which the compass is mounted, the parts carried upon the plate will move relatively to the compass needle and mirror 14, so that the light reflected from this mirror will strike one of two mirrors 23, 24 angularly disposed upon the wall of the closure 20, one at either side of slot 21, and will be reflected therefrom to one or the other of two photo-electric tubes 25, 26.

Tubes 25 and 26 have electrical connection each with one of a pair of thyratron tubes 27, 28, these tubes being biased through a rheostat 29 as shown diagrammatically in Fig. 1. The grid of either one of these thyratron tubes, being slightly raised in potential by the photoelectric emission of tube 25 or 26, in response to the light beam, serves to establish a circuit of comparatively high voltage through the thyratron and through a related relay 30 or 32, which in turn controls means for rotating plate 18 in one or in the other direction.

As shown, the relays 30, 32 serve to throw a pole reversing switch 31 interposed in the circuit of an electric motor 33, which motor has driving connection, hereinafter described, with a pinion 35 (Fig. 1) which meshes with gear teeth formed in the periphery of plate 18. The follower mechanism will keep the plate rotating first in one and then in the other direction, as controlled by the tubes 25, 26, in known manner, so that the source of light will be carried around the compass bowl in following relative movement of the needle.

The repeater compass

Figure 5:
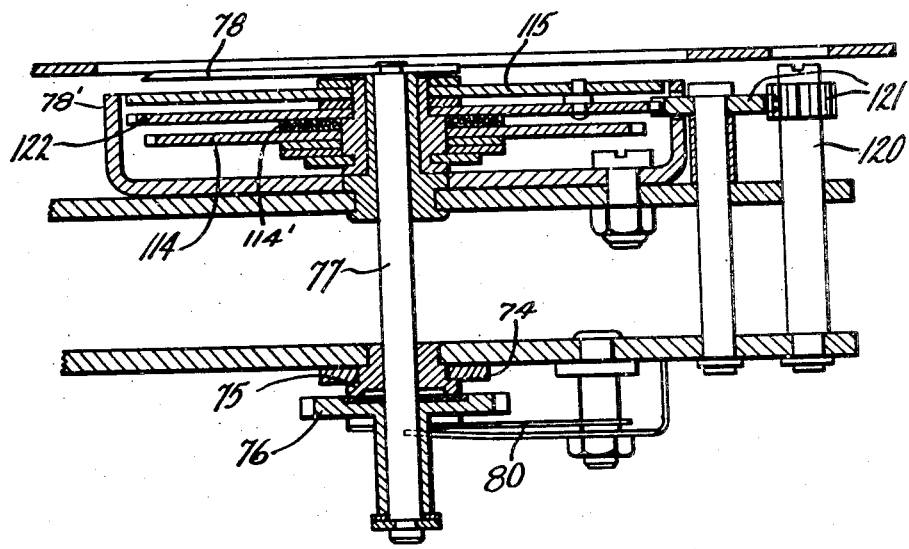
Fig. 5 is an enlarged central transverse vertical sectional view through the repeater dial and associated parts.

A shaft 70 (Figs. 2, 3, 4 and 7) is driven from motor 33 through gearing 71 and has fast thereon a worm 72 which meshes with the worm wheel 73 of a train of gears 73, 73', 76 mounted upon an arm 74, pivoted upon a bushing 75 (Fig. 5) inserted in a supporting frame. Gear 76, in train with pinion 73, is fast upon a shaft 77 to which the hand 78 of the repeater compass 78' is fixed, said shaft passing through the bushing 75. Arm 74 is provided with a bifurcated extension 74', and pivotal movement of this arm is limited by engagement of the jaws of extension 74' with an adjustable stop 79 which stop, in its normal position of adjustment, allows limited oscillatory movement of the arm 74. A spring brake 80 bears upon a lateral face of gear 76 to provide friction.

Shaft 70 has driving connection through gearing 81 with a shaft 82, connected with the pinion 35 of the compass follower mechanism which, as stated, regulates the reversal of the drive from motor 33. (The driving connection between parts 82 and 35 will be more particularly described under the heading of "The reorienting means"). Therefore, when the circuit through the motor is established, shaft 70 will be given an oscillating motion and also an over all rotary motion in following the compass needle in its movements relative to the conveyance. The gearing 73, 76 and arm 74 have in the normal adjustment of stop 79 a differential movement whereby the oscillatory hunting action is not transmitted to hand 78, but merely the over all rotational movement. This is effected because of the relative absence of friction encountered in the pivotal movement of arm 74 as compared with the friction encountered in the gear train 73, 76 and the spring brake 80. Therefore, upon rotation of shaft 70 and worm 72, arm 74 will be oscillated to the limit of the movement allowed by stop 79 and hand 78 will be rotated only when the oscillation of arm 74 in one direction or the other is excessive, whereupon pinion 73 will be rotated and movement transmitted to shaft 77.

Stop 79 is formed as a cone, provided with a flat base 79'·engaging a frame plate 79" to prevent rotation of the stop. For purposes of adjustment this stop 79 is longitudinally bored and screw threaded and is engaged, as a nut, with a screw 83, mounted in bearings 84, 84 of the frame and held frictionally against rotation by spring 85. Screw 83 is provided with a knurled head 83' by means of which stop nut 79 may be adjusted relative to the jaws of extension 74'. In normal adjustment of stop nut 79, the lost oscillatory motion of arm 74 is sufficient to counteract or substantially counteract the hunting movement of the compass controlled follower mechanism, so that hand 78 will not oscillate. However, the base of the cone shaped stop nut 79 is broad enough to form a rigid lock against movement for arm 74, when stop 79 is adjusted to engage the stationary frame plate, thus establishing a direct drive of the hand 78 from shaft 70 which will be useful as hereinafter described.

The integrator

The repeater compass may be used in connection with other mechanism, such as an odograph; means for charting deviations from a ship's course; automatic steering mechanism, etc. Such mechanism includes an integrator, to be now described, being means whereby the different directional components (such as north or south and east or west), of the progressive movement of a vehicle may be integrated to effect movement of a stylus to record upon a chart the direction and extent of such movement, that is to say to record the path of the vehicle.

In the present application an odograph is shown, whereby a map or chart is plotted to represent the course of a conveyance. The chart table 86' is shown in Fig. 6, wherein a holder 86 for a pen, pencil or stylus 87 is mounted on cross rods 88, 88, in known manner, movement of holder 86 and stylus 87 being determined by the travel of nuts 89' upon right angularly related threaded rods 91, said threaded rods being rotated by gears 92 from said integrating means as will be explained. The cross rods 88 have at the ends thereof pinions 89 traveling upon racks 90.

The progressive movement of the conveyance is measured through the driving motion of a propeller shaft, automatic log, speedometer or other appropriate source, from which motion is transmitted through a shaft 93 (Fig. 7).

Rotation of shaft 93 is transmitted through gearing 94 to toothed cylinders 95, 96, these cylinders being driven in opposite directions at a speed proportional to the speed or rate of advance of the conveyance.

The pinions 97 are mounted upon splined shafts 98 located upon opposite sides of and having their longitudinal axes parallel to the cylinders 95, 96, these pinions meshing with the teeth 97' of the cylinders, and being moved longitudinally thereof by means of fingers 99 of bars 99' located upon opposite sides of said shafts 98, said bars being mounted upon reciprocatory plates 100, the latter being carried by links 101, pivoted at one end thereto at 101' and at the other end pivoted upon shafts 101". The plates 100 and consequently the pinions 97 are reciprocated by means of two rollers 102 of crank arms 102' located upon opposite ends of a shaft 103 having bearings in the stationary framing, said crank arms being located at right angles to each other and said shaft 103 being driven by gears 104 from said shaft 70.

Shafts 98, 98 are provided with worms 105, 105, meshing with worm wheels 106, 106 fast respectively upon a shaft 107 and a sleeve 108, this shaft and sleeve having respective gearing connection (not shown) with the gears 92 associated with the chart table 86'.

The reorienting means

It will be obvious from the aforesaid and what will follow that the repeater dial 115 (to be described), the repeater hand 78 (when the lost motion of arm 74 is eliminated), and the integrating means of the odograph, will all by the use of this invention become reoriented or reset relative to the magnetic compass, in unison.

Between the shaft 82 and the pinion 35 is interposed movement transmission means which in the present case is a planetary differential gearing of conventional type, located at point 109 (Fig. 3), but not shown in detail. The first leg of this differential is fast to shaft 82 and receives motion therefrom; the second leg is fast to a shaft 110, having direct driving connection (not shown) with the pinion 35, and the third leg is fast with a gear 111, with which meshes spur gear 112', the shaft of which has bevel gear connection 112 with a shaft 117, the latter having spur gear connection 117" with a shaft carrying a pinion 113 (Fig. 4) meshing with a gear 114 (Figs. 4 and 5) having frictional driving connection 114' with the gear 122 (to be described), the latter being fast to dial 115 of the repeater compass.

This third leg of the differential is normally locked against movement by means of a manipulabel device or jamb nut 116 (Fig. 4) engaging the upper threaded portion of said shaft 117, which is capable of slight slidable reciprocatory movement in bearings of the stationary frame. Turning of nut 116 down against a sleeve 118 will pull shaft 117 upwardly, bringing a collar 119 of said shaft into frictional contact with a plate of the stationary frame. Under these conditions, the drive will go directly from shaft 82 to shaft 110.

Upon loosening of nut 116, however, the frictional load upon the second leg 110 of the differential will be greater than the load upon the third leg 111, so that the movement transmission gearing will be rendered ineffective with respect to the compass controlled follower mechanism and will be rendered effective with respect to the dial 115; and will also be rendered effective with respect to the hand 78, provided stop nut 79 is adjusted to eliminate lost motion of arm 74. The gear ratios are so designed that movement of dial 115 through the driving connections 112, etc., to 114 as aforesaid and the movement of hand 78 through gearing 73, 76 (with stop nut 79 adjusted to eliminate the lost motion of arm 74) will be at the same speed and in the same direction.

In order to effect the aforesaid reorientation of the dial 115 and the hand 78 of the repeater compass, and of the integrating means of the odograph, with respect to the magnetic compass, the procedure is as follows: A knurled head 117' on shaft 117 is grasped and nut 116 loosened from sleeve 118 to eliminate frictional engagement of collar 119 with the stationary frame, the knurled head now being released, so that the drive of hand 78 and dial 115 by the motor will be established and will serve to move these parts progressively in a single direction (either clockwise or counterclockwise), since the motor reversing means normally actuated by the compass controlled follower mechanism will remain out of action. As soon as the graduations of dial 115 have arrived in the desired position relative to the conveyance the knurled head 117' of shaft 117 is again grasped and nut 116 again tightened against sleeve 118.

The stop nut 79 being tightened against the stationary frame and the arm 74 consequently locked against movement, there can be no movement of hand 78 relative to dial 115 of the repeater compass, said hand and said dial being moved in unison in the reorientation thereof.

A second adjusting means is associated with that hereinbefore described, this second means comprising a stud shaft 120 (Fig. 5) having gearing connection 121 with a gear 122, fast with the repeater dial 115. The upper end of shaft 120 is provided with a seat for a screw driver by means of which shaft 120 may be turned to effect rotary movement of dial 115 relative to its frictional driving gear 110 and relative to hand 78.

In making the adjustment, dial 115 is rotated reversely the number of degrees by which the repeater compass is intended to be reset. Thereafter shaft 117 is released as in the above described reorienting operation, and the hand 78 and dial 115 are allowed to move until the dial comes to its original orientation, whereupon movement of shaft 117 is stopped and the new adjustment secured. Stop nut 79 will of course be adjusted to eliminate lost motion of arm 74 during this operation as in that first described.

I claim:

1. In an instrument of the character described, the combination with magnetic compass controlled motor driven follower mechanism; of direction indicating mechanism including a repeater dial and a repeater hand, part of the driving connection between the motor and the follower mechanism forming part of movement transmission means between the motor, said dial and said hand normally ineffective with respect to said dial and said hand for other than repeater compass purposes, and means including manipulable means for rendering said transmission ineffective with respect to said follower mechanism and effective with respect to said dial and said hand to drive both dial and hand in a single direction in unison to reset the same relative to the magnetic compass.

2. In an instrument of the character described, the combination with magnetic compass controlled motor driven follower mechanism; of direction indicating mechanism including a repeater dial and a repeater hand, part of the driving connection between the motor and the follower mechanism forming part of movement transmission means between the motor, said dial and said hand normally ineffective with respect to said dial and said hand for other than repeater compass purposes, means including manipulable means for rendering said transmission ineffective with respect to said follower mechanism and effective with respect to said dial and said hand to drive both dial and hand in a single direction in unison to reset the same relative to the magnetic compass, said transmission including a frictional drive to said dial, and means manipulable to rotatably adjust said dial with respect to said frictional drive.

3. In an instrument of the character described, the combination with magnetic compass controlled motor driven follower mechanism; of direction indicating mechanism including a repeater dial and a repeater hand, part of the driving connection between the motor and the follower mechanism forming part of movement transmission means between the motor, said dial and said hand normally ineffective with respect to said dial and said hand for other than repeater compass purposes, means including manipulable means for rendering said transmission ineffective with respect to said follower mechanism and effective with respect to said dial and said hand to drive both dial and hand in a single direction in unison to reset the same relative to the magnetic compass, said transmission including secondary movement transmission means normally incapable of transmitting movement to said hand and having lost oscillatory motion, and said manipulable means including secondary manipulable means for rendering said secondary transmission capable of transmitting movement to said hand and for eliminating said lost motion.

4. In an instrument of the character described, the combination with magnetic compass controlled motor driven follower mechanism; of direction indicating mechanism including a repeater dial and a repeater hand, part of the driving connection between the motor and the follower mechanism forming part of movement transmission means between the motor, said dial and said hand normally ineffective with respect to said dial and said hand for other than repeater compass purposes, and means including manipulable means for rendering said transmission ineffective with respect to said follower mechanism and effective with respect to said dial and said hand to drive both dial and hand in a single direction in unison to reset the same relative to the magnetic compass, said transmission including secondary movement transmission means normally incapable of transmitting movement to said hand and having lost oscillatory motion, and said manipulable means including secondary manipulable means adjustable to render said secondary transmission predeterminably partially or fully capable of transmitting movement to said hand and for partially or fully eliminating lost motion.

5. In an instrument of the character described, the combination with magnetic compass controlled motor driven follower mechanism; of direction indicating mechanism including a repeater hand, part of the driving connection between the motor and the follower mechanism forming part of movement transmission means between the motor, and said hand normally ineffective with respect to said hand for other than repeater compass purposes, and means including manipulable means for rendering said transmission ineffective with respect to said follower mechanism and effective with respect to said hand to drive the latter in a single direction to reset the same relative to the magnetic compass, said manipulable means including a tapered stop and said transmission including an oscillatory element having a forked end embracing said stop, said stop being normally positioned to permit limited lost oscillatory motion of said element prior to engaging said stop and being adjustable to engage the said element and render the same incapable of such lost motion.

LORING P. CROSMAN.

REFERENCES CITED

The following references are of record in the file of this patent:

UNITED STATES PATENTS

| Number | Name | Date |
|---|---|---|
| 1,585,210 | Roux | May 18, 1926 |
| 1,617,310 | Sperry | Feb. 8, 1927 |
| 1,785,241 | Bates | Dec. 16, 1930 |
| 1,911,168 | Sperry et al. | May 23, 1933 |
| 1,959,144 | Wittkuhns | May 15, 1934 |
| 2,325,365 | Britten | July 27, 1943 |

FOREIGN PATENTS

| Number | Country | Date |
|---|---|---|
| 250,946 | Great Britain | 1925 |